United States Patent [19]

Young, Sr.

[11] 4,017,912
[45] Apr. 19, 1977

[54] METERABLE WATER CLOSET

[76] Inventor: Daniel J. Young, Sr., 3137 Capri Road, Lake Park, Fla. 33410

[22] Filed: Nov. 5, 1975

[21] Appl. No.: 629,144

[52] U.S. Cl. .......................................... 4/1; 4/67 A
[51] Int. Cl.² ........................................ A47K 17/00
[58] Field of Search ............ 4/1, 67 R, 67 A, 57 P, 4/57 R, 56, 18, 26, 34, 37, 32, 35, 39, 40, 41

[56] References Cited

UNITED STATES PATENTS

| | | | |
|---|---|---|---|
| 2,440,389 | 4/1948 | Anderson, Sr. | 4/57 R |
| 2,526,294 | 10/1950 | Stageman | 4/67 A |
| 2,645,780 | 7/1953 | Becker | 4/67 A |
| 2,744,261 | 5/1956 | Gram | 4/67 A |
| 2,950,483 | 8/1960 | Richards | 4/67 A |
| 3,156,930 | 11/1964 | Moulton et al. | 4/67 A |
| 3,259,918 | 7/1966 | Walker, Sr. et al. | 4/18 |
| 3,775,778 | 4/1973 | Lee | 4/67 A |
| 3,877,081 | 4/1975 | Klein | 4/1 |
| 3,885,253 | 5/1975 | Overbey | 4/67 A |

*Primary Examiner*—Henry K. Artis

[57] ABSTRACT

A water closet having two operational modes, one for a partial flush and the other for a full tank flush, utilized in conjunction with a bowl trap fill meter tank which reduces water consumption. A two position actuating linkage utilized in conjunction with an auxiliary float provides positive partial or full tank flush operation dependent upon the directional movement of the flush lever handle by an operator. A bowl trap fill meter tank disposed in the flush tank is utilized for refilling the toilet bowl trap, reducing the amount of excess water normally wasted in conventional flush tanks during flushing and refilling of the tank and bowl. The flush actuating mechanism includes a selectively pivotal ball stopper trip arm which when moved in a first direction pivots to raise the flush ball stopper for a conventional full flush operation and in a second direction raises the ball stopper while releasing a ball stopper return mechanism, such that the ball stopper is returned to the closed position before the flush tank is emptied. The bowl refill tube found in a conventional flush tank is diverted into the trap meter tank which is filled each time the tank is flushed. A second conduit from the meter tank back into the overflow pipe provides for the filling of the trap through siphoning action or gravity feed.

4 Claims, 7 Drawing Figures

U.S. Patent    April 19, 1977    Sheet 1 of 3    4,017,912
Fig. 2.
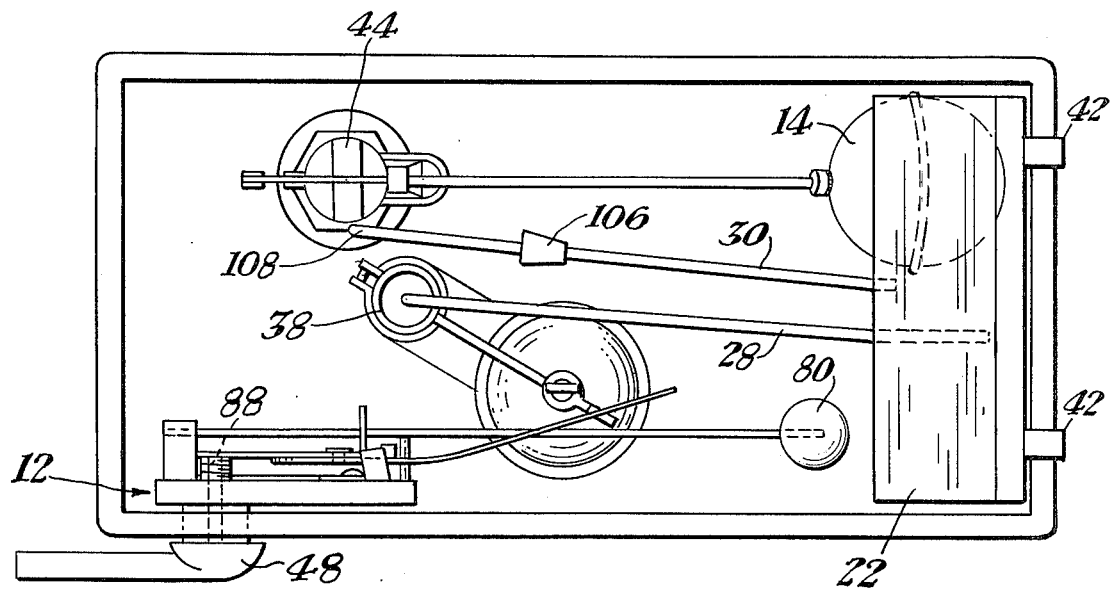
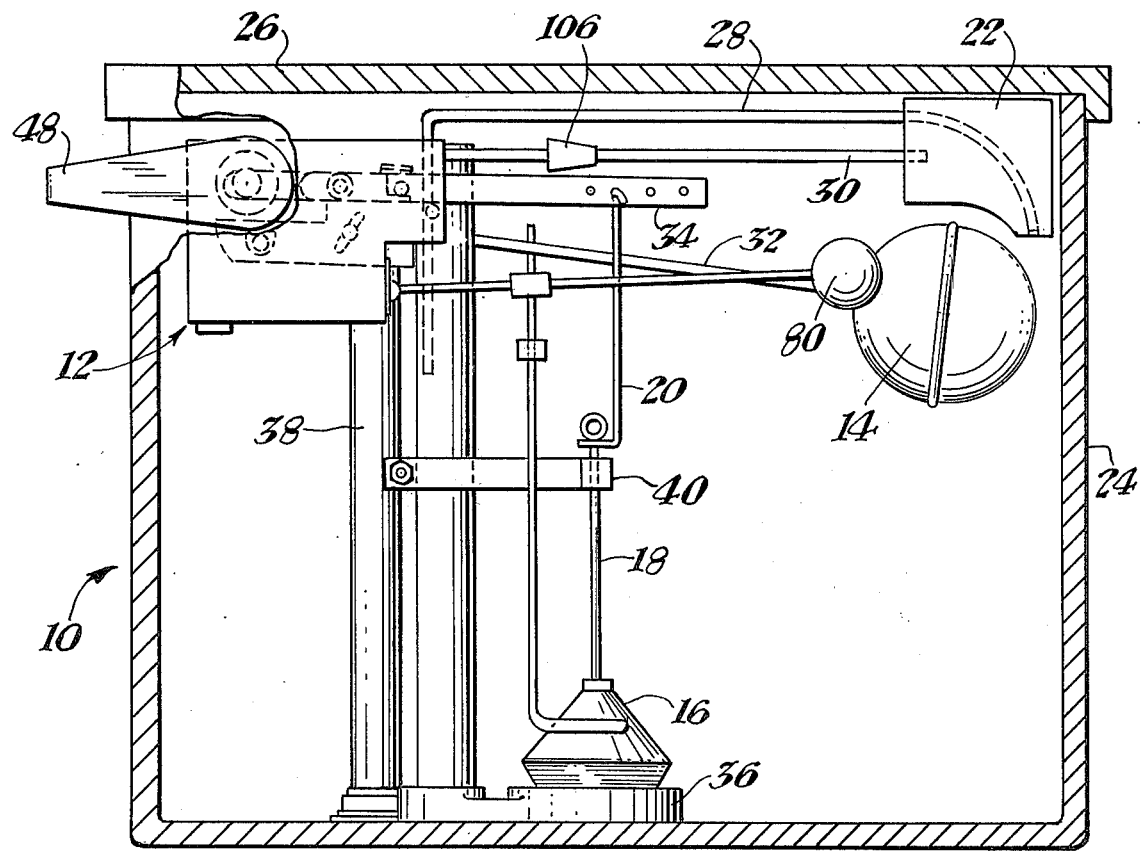
Fig. 1.

METERABLE WATER CLOSET

BACKGROUND OF THE INVENTION

This invention relates generally to an actuating mechanism for a water closet which reduces water waste without affecting the function of a conventional water closet. The invention may be easily and quickly installed in a conventional flush tank found in present day water closets.

In recent years water conversation at the individual household level has become important because of the extremely large volume of water being consumed daily by a growing population. The conventional home water closet utilizes in most instances a flush tank having a fixed volume of water which is utilized to flush the toilet bowl. It has been determined that the large volume of water found in a conventional flush tank need not always be expended to thoroughly clean the bowl. Also in the operation of a conventional flush tank, one to two gallons of water are wastaed in filling the trap and bowl, since the bowl trap in excessively filled while the flush tank is being filled. Many devices have been shown in the prior art to attempt to provide a two-stage or dual mode of operation for partial and full flush of the flush tank. But many of these devices have been extremely complex in operation, reducing the reliability of the flush tank while increasing the costs of installation. Further, the prior art has not shown a device to reduce the excess flow going into the trap and bowl during and after the flush tank has been actuated.

The instant invention provides a non-complex linkage arm and auxiliary float used in conjunction with a bowl trap meter tank which provides partial or full flush operation of the flush tank while reducing water waste when filling the trap.

Brief Description of the Invention

An improved actuating mechanism for controlling the ball stopper of a flush tank to selectively provide partial or full flush operation in which the tank includes a water outlet adjacent its bottom wall that receives a conventional ball stopper. The actuating mechanism includes a conventional flush lever handle, a pivotal trip arm linked to the flush handle and a ball stopper return latching mechanism actuated by the trip arm for controlling a stopper return lever. The latching mechanism includes a release plate having an arcuate groove and a diagonally disposed groove which receive fasteners that allow for pivotal movement of the plate as coupled to a supporting block. The release plate includes a right angle flange which releasably engages the ball stopper return lever. A stopper return lever latch is engageable with the release plate for locking the stopper return lever during a full flush operation. Movement of the flush lever handle in one direction provides for a full tank flush while movement in other direction causes a partial tank flush.

In the partial flush mode of operation, the flush lever handle is rotated so that the ball stopper is reaised while the release plate moves, disengaging the ball stopper return lever which pivotally falls downward with the receding water level, forcing the stopper to prematurely close, stopping the flow of water from the tank into the bowl, resulting in a partial flushing of the tank. An auxiliary float attached to the ball stopper return lever moves the return lever upward during tank refilling, re-engaging the release plate and the ball stopper return lever latch so that the actuating mechanism is ready for partial or full flush tank operation each time the tank is refilled.

During the full flush operation, rotation of the flush lever handle (in the opposite direction) raises the flush ball stopper without disturbing the release plate, preventing the release of the ball stopper return lever.

For additional water saving, a bowl trap fill meter tank is positioned above the full tank water within the flush tank, with the trap meter tank receiving the refiller tube outlet which is conventionally disposed in the overflow tube for filling the bowl and trap. However, in the instant invention, the meter tank is filled by the refiller tube during the filling of the flush tank. A second conduit extended between the meter tank and the overflow tube which has its outlet ih fluid communication with the bowl and trap acts to siphon water from the meter tank into the trap through the overflow tube, the amount of volume of the water being the volume of the meter tank. Gravity flow could likewise be utilized in lieu of the siphon. Once the meter tank which has a top opening is filled, excess water from the refiller tube outlet will spill over back into the flush tank, thus saving excess water that would be normally diverted into the trap and bowl. In summary, with regard to the meter tank, the maximum amount of water which can be disposed into the trap is a fixed amount determined by the actual volume of the meter tank. The meter tank may be conveniently and quickly inserted into a conventional flush tank and may be so shaped to accommodate the other equipment elements already found in the conventional flush tank.

It is an object of this invention to provide an improved flush tank actuating mechanism having two modes of operation which allow for either a partial or full flush of the water in the flush tank.

It is another object of this invention to provide a flush tank actuating mechanism that is adaptable to be installed in a conventional flush tank which results in an increased saving of water and allows for partial or full flushing of the tank.

But yet still another object of this invention is to provide a flush tank actuating mechanism which includes a bowl trap fill meter tank for reducing excess water loss in the refilling of the bowl and bowl trap.

And yet still another object of this invention is to provide an improved readily installable dual mode flush tank actuating mechanism and bowl trap fill meter tank for reducing the amount of water utilized in filling the toilet bowl and trap.

And still yet another object of this invention is to provide an improved economical flush tank actuating mechanism of reduced cost and complexity and increased flush tank efficiency.

In accordance with these and other obects which will be apparent hereinafter, the instant invention will now be described with particular reference to the accompanying drawings.

BRIEF DESCRIPTION OF THE DRAWINGS

FIG. 1 shows a flush tank in a front elevational view partially in cross-section.

FIG. 2 is a top plan view of a flush tank with the top cover removed showing the instant invention.

PREFERRED EMBODIMENT OF THE INVENTION

Figure 3A:
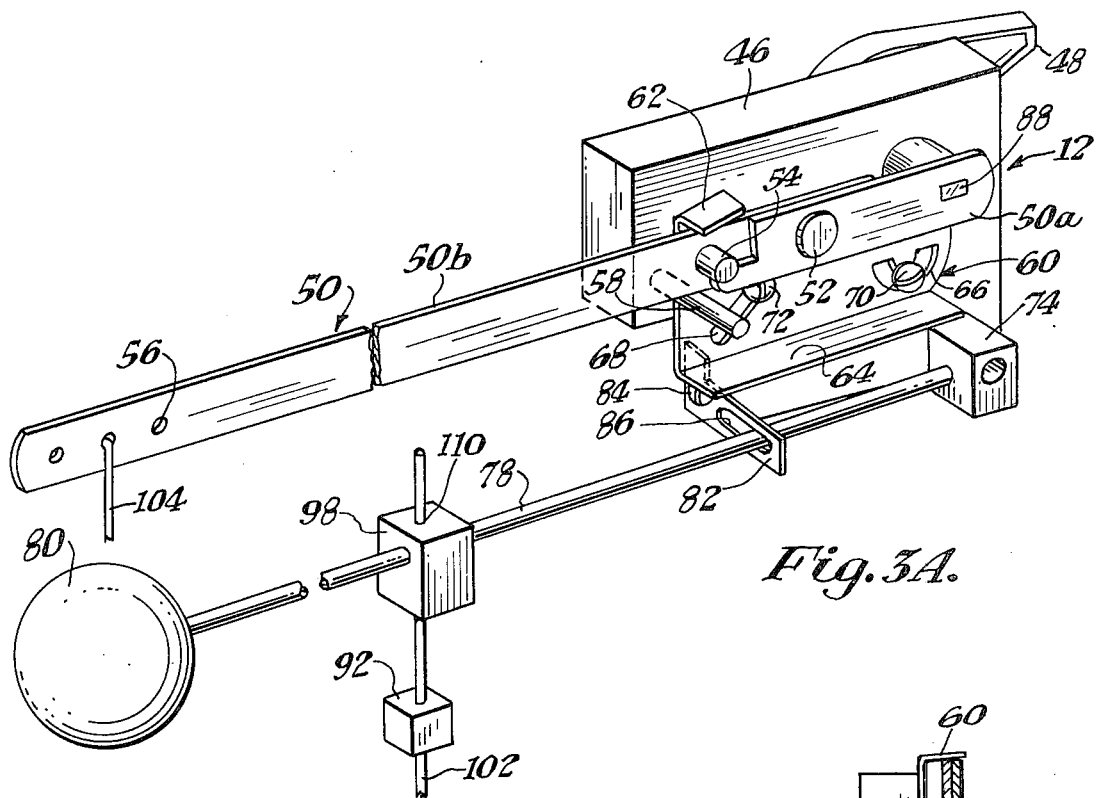
FIG. 3A is a perspective view of the actuating mechanism utilized in the instant invention in the rest mode of operation.

Referring now to the drawings and specifically FIG. 1, a water closet tank 10 is shown comprised of a water tank 24 having a top 26 and a water outlet 36 at the bottom of the tank. Disposed within the tank 24 is an actuating mechanism 12 which allows the tank to be fully or partially flushed by raising ball stopper 16 when handle 48 is moved. The actuating mechanism 12 is connected by a trip arm 34 to a linkage wire 20 which raises the ball stopper 16 connected to lift wire 18. Disposed adjacent the upper corner of the tank is a bowl trap fill meter tank 22 receiving the outlet end of refill tube 30 which is connected to the conventional water inlet valve 44 which controls flow into the meter tank 22. A second fluid conduit 28 has one end connected inside the meter tank 22 and an opposite end disposed in the overflow tube 38. Conduit 28 is positioned to that it remains below the maximum fluid level of tank 22 so that the conduit 28 is filled when the tank 22 is full, creating a siphon to empty tank 22 into the overflow tube.

In FIG. 2, the meter tank 22 is shown connected to the side of the flush tank by brackets 42. An adaptor conduit connection 106 allows conduit 30 to be connected to the end of the conventional refiller tube 108 and may include a fluid flow restricter to reduce flow rate into meter tank 22.

Referring back to FIG. 1, when the flushing mechanism is actuated by movement of handle 48 and the ball stopper is raised, the water will begin flowing into the toilet bowl through outlet 36 in the bottom of the tank 24. Float 14 drops with the water level, thus turning on the water inlet valve initiating flow in the refill tube and the tank 24 filler tube. Actuation of the inlet water valve by movement of the float commences water flow into the meter tank 22 and simultaneously into the flush tank 24. When the meter tank 22 is filled to capactiy through the conduit 30 and conduit 28 is full (positioned below the upper water level of meter tank 22), water in the meter tank 22 will siphon through conduit 28 into the overflow tube 38 which empties into the bowl and trap. Thus, the bowl and trap can only receive the amount of water in the meter tank 22. Any excess water received through conduit 30 into the meter tank 22 spills over from the top (which is open) back into the flush tank for use. Flow restricter in adaptor 106 reduces overflow from meter tank 22.

The effect of the use of the meter tank 22, the refill tube 30 and the siphon tube 28 are to limit the specific quantity of water received into the bowl and trap during each flushing of the flush tank. Meter tank 22 could, in an alternate embodiment, be emptied by gravity flow in lieu of siphoning.

The meter tank may be placed anywhere within the flush tank that is convenient and does not interfere with the actuating and linkage mechanisms for actuating the flush bowl.

In FIG. 2, the inlet water valve 44 is shown including the refill tube 108 connected by adapter 106 to conduit 30 into meter tank 22. The meter tank oulet siphon tube 28 is shown disposed between the meter tank and the overflow tube 38.

FIG. 3A shows the latching mechanism for actuating the flush tank valve which is achieved by raising a conventional flush ball disposed over the bottom tank outlet. The flush actuating mechanism may be used in conjunction with the meter tank for additional water saving and includes a supporting block 46 which has a conventional flush lever handle 48 attached to a shaft 88 disposed through the block and connected at one end to trip arm 500 which acts to raise the flush ball stopper. The trip arm 50 is constructed of a link 50a pivotally attached to outer arm 50b by connector 52. Arm 50b has a lug 54 attached thereto to engage the angled end portion of link 50a such that when handle 48 is rotated downwardly, entire arm 50 will raise vertically since the angled end of link 50a engages lug 54 causing the arm 50 to act as a straight rod. Also moveably connected to supporting block 46 is a moveable release plate 60 having a small upper 90° portion 62 protruding outwardly fron the block surface and an L-shaped lip along the bottom 64 which likewise protrudes outwardly. The release plate 60 is moveably coupled to the block 46 by a pair of connectors 70 and 72 which may be screws or the like which are disposed in an arcuate slot 66 and a diagonal slot 68. Connected below the release plate 60 is a small pivotable block 74 moveably connected to block 46 by connector 76. Protruding and fastened to block 74 is a ball stopper return lever 78 having auxiliary float 80 attached at its opposite end. A stopper drive block 98 is connected to lever 78. The lever 78 is disposed through a moveable latch 82 which has an upper right angle portion, the latch being pivotally coupled to the end face of block 46 by a connector 84. The trip arm 50 has a plurality of apertures 56 any one of which receives wire linkage 104 connecting the trip arm 50 to the ball stopper.

The flush actuating mechanism shown in FIG. 3A is capable of positioning the flush ball stopper of a conventional flush tank such that the flush tank is capable of a full flush operation in which all the water in the tank is transferred into the bowl or a partial flush for saving water. The device as shown in FIG. 3A is in a neutral or rest position such that the auxiliary float 80 and ball stopper return lever 78 are held by latch 82 to the release plate 60. The operation of either full flush or partial flush is achieved merely by selective directional rotation of handle 48 (which is shown in substantially a horizontal position in FIG. 3A). Rotation of the handle upwardly in a vertical direction causes a full flush while rotation downwardly results in partial flush, both of which are explained in greater detail below.

Figure 3B:
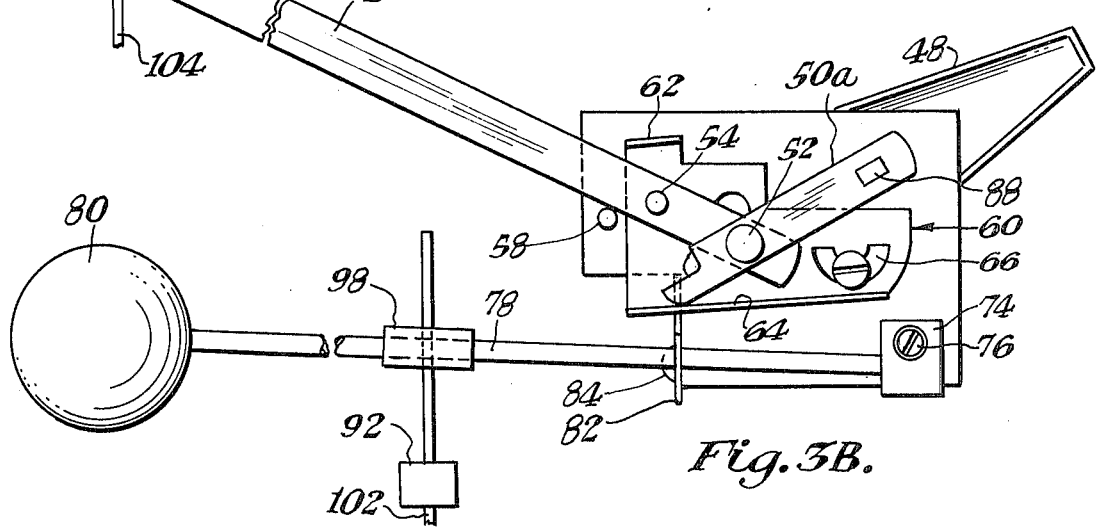
FIG. 3B shows the device shown in FIG. 3A with the handle actuated for the full flush operation.

Referring now to FIG. 3B, the actuating mechanism is shown with the handle 48 having been rotated upward or vertically causing link 50a to move downwardly engaging the protruding lip 64 of the actuating plate 60. The movement also causes the moveable arm 50b to rotate upwardly which raises wire linkage 104 connected to the ball stopper, raising the ball stopper so that the tank flushes completely. Releasing the handle, the mechanism will return to a neutral position shown in FIG. 3A. The upward motion of the moveable arm 50b is caused by lug 58 protruding from block 46 and positioned below the arm 50b. During the full flush actuation, the float 80 and ball stopper return lever 78 remain engaged with the release plate 60 and do not move.

Figure 3C:
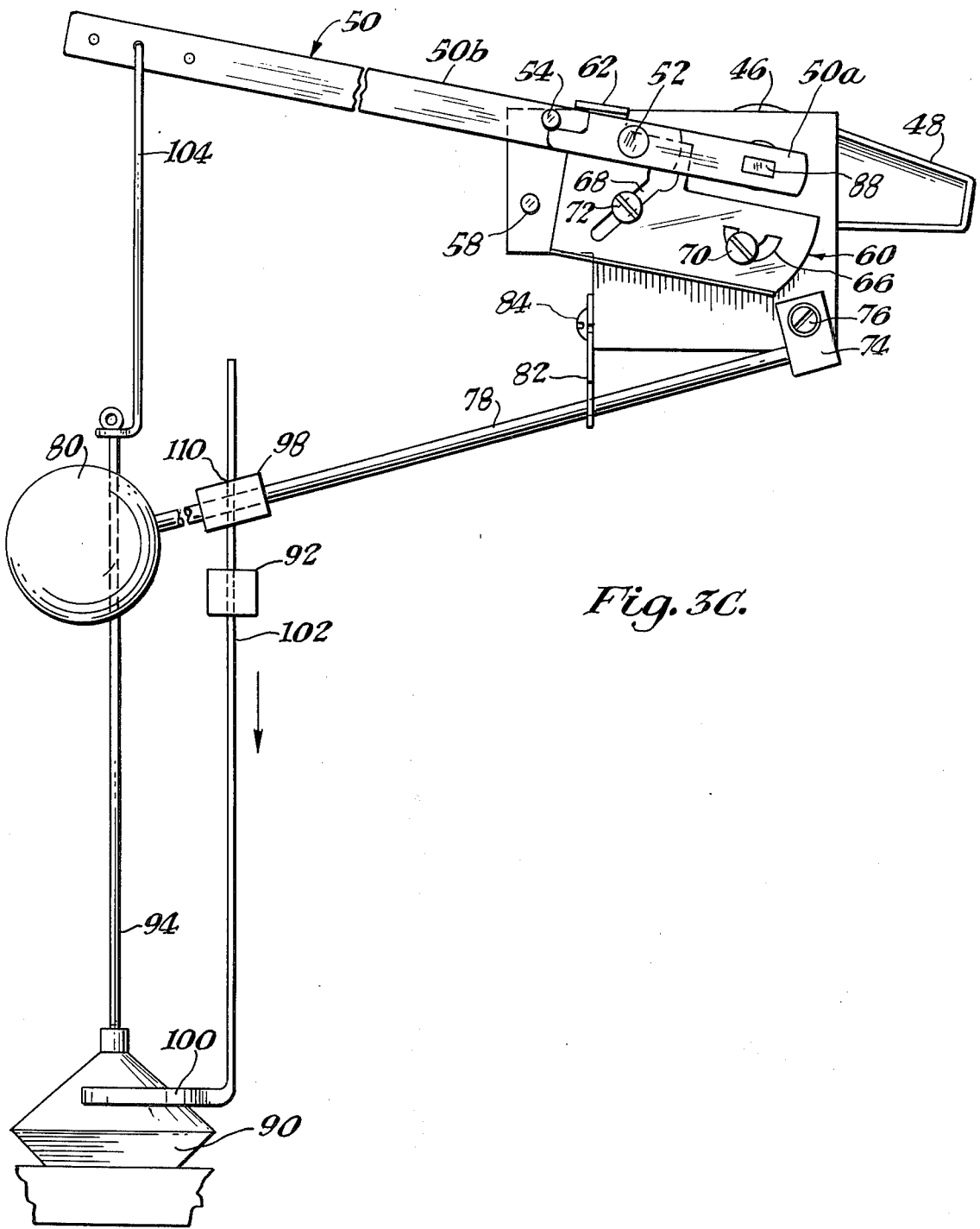
FIG. 3C shows the device of FIG. 3A with the handle moved to the partial flush mode of operation.

A partial flush operation is shown in FIG. 3C in which handle 48 has been rotated downwardly causing the trip arm 50 to move upwardly with link 50a and moveable arm portion 50b acting as a solid arm beacuse of lug 54. The upward movement of trip arm 50 which again when raised lifts the ball stopper from the outlet valve allowing water to flow out of the tank also raises the release plate 60 because of the engagement of arm 50 with the upper lip 62 of the release plate. Movement of the release plate 60 is permitted because of arcuate slot 66 and diagonal slot 68 which provide for somewhat pivotal motion relative to block 46. When the plate 60 is raised by the movement of arm 50, latch 82 is released and pivots downwardly as float 80 drops with the receding water level. Movement of the lever 78 causes lever block 98 to engage the stopper return block 92 coupled to stopper return guide 100, forcing the stopper downward back into a sealed engagement over the tank water outlet, stopping the flow of water out of the tank before the tank has emptied. Stopper return block 92 is frictionally attached to guide wire 102 and is moveably adjustable along the guide wire for regulating the amount of flow from the flush tank during partial flush operation. The water inlet valve at this time is on since the flush tank float has dropped. Auxiliary float 80 rests on the surface of the water and begins rising as the tank is refilling. After handle 48 is released, the release plate 60 and trip arm 50 return to the neutral position as shown in FIG. 3A. As the water level in the flush tank rises, float 80 rises, raising lever 78 which rotates latch 82 to such a point that the 90° upper portion of latch 82 then engages plate 62 latching the lever 78 and float 80 back to the neutral position as shown in FIG. 3A.

Figures 4A, 4B:
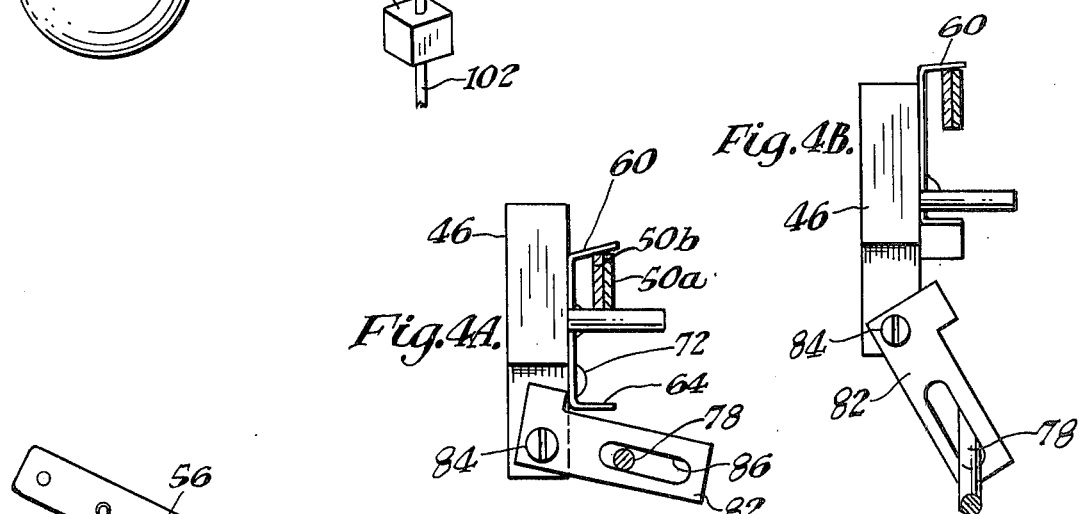
FIGS. 4A and 4B show a side elevational view of the actuating mechanism utilized in the instant invention.

Referring now to FIG. 4A, the latching mechanism is shown in the neutral position. The latching mechanism 82 is essentially an L-shaped plate having an elliptical aperture 86 which receives lever 78. The latch 82 is rotatably connected to the end face of block 46 by connector 84 which may be a screw or the like. The L-shaped portion of release plate 60 thus engages the right angle portion of the latch 82 firmly holding the latch in position.

Referring now to FIG. 4B the release plate 60 is shown in the raised position such as during partial flush (shown in FIG. 3C) such that the release plate 60 is no longer engaged with the upper surface of latch 82. Downward movement of lever 78 causes the latch 82 to rotate and drop downward. Once handle 48 is released, arm 50 will drop engaging lug 58 to its neutral position. However the downward movement of lever 78 forces the ball stopper 90 downward, thus closing off water flow from the tank once the stopper 90 is seated in the bottom outlet.

Thus the tank is shown to have two operational modes, partial or full flush, utilizing an actuating mechanism that may be easily installed in a conventional flush tank.

The ball stopper return guide wire 102 is received and held vertically by an aperture 110 disposed through lever block 98 so that the wire 102 moves freely through the block 98 allowing the lever 78 to pivot freely vertically. Only when the stopper return block 92 engages the lever block 98 will the ball stopper 90 (FIG. 3C) be forced downward.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. In a water closet having a trap, a flush tank, a water inlet valve, an overflow pipe coupled into the toilet bowl, a flush bowl and a flush bowl actuating mechanism, a device for conserving the amount of water received in said trap comprising:
   a trap fill meter tank disposed within said flush tank;
   a conduit from said inlet water valve connected into said meter tank;
   a siphon tube disposed with one end in said meter tank and the opposite end disposed in said overflow pipe, said siphon tube being positioned below the uppermost level in the meter tank when filled and said meter tank having an open top whereby during the flushing operation of the flush tank, the inlet water valve will fill the meter tank and the siphon conduit will empty the meter tank into the overflow pipe filling said trap with a predetermined amount of water.

2. A flush tank, as in claim 1, wherein said conduit between said inlet water valve and said meter tank includes:
   a conventional refiller tube coupled at one end to said inlet valve;
   an auxiliary tube having one end disposed within said meter tank; and
   an adaptor connecting said refiller tube to said auxiliary tube.

3. The device, as in claim 2, including:
   a flow restricter means connected to said adaptor for restricting the flow between said inlet valve and said meter tank.

4. A device, as in claim 1, wherein said flush bowl actuating mechanism includes:
   a supporting block;
   a release plate moveably coupled to said supporting block, said plate having a U-shaped portion;
   an actuating handle connected through said supporting block;
   a flush ball stopper trip arm, said arm having a first link connected at one end to said handle and a second linkage arm pivotally connected at the opposite end of said first linkage arm, said second arm including a lug adjacent the end of said first arm, said first arm having an engaging surface portion disposed beneath but engageable with the lug on said second arm;
   a latch disposed on the end face of said block, said latch having an engaging upper portion engageable with said release plate in a first position;
   a ball stopper connected to said trip arm;
   a shaft moveably coupled at one end to said block, said shaft being disposed through an aperture in said latch;
   a ball stopper return means connected to said shaft and said ball stopper; and
   a float attached to the free end of said shaft whereby said linkage arm is engageable with said release plate to move said plate upon rotation of the handle in a particular direction releasing the latch, allowing the latch and shaft to drop, engaging the ball stopper return means forcing the stopper over the outlet of the tank before the tank is empty.

* * * * *